(12) United States Patent
Park (10) Patent No.: US 8,760,565 B2
(45) Date of Patent: Jun. 24, 2014

(54) DIGITAL PHOTOGRAPHING APPARATUS AND METHOD FOR CONTROLLING THE SAME BASED ON USER-SPECIFIED DEPTH OF FOCUS REGION

(75) Inventor: Ie-ryung Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 34 days.

(21) Appl. No.: 13/336,772

(22) Filed: Dec. 23, 2011

(65) Prior Publication Data

US 2012/0320253 A1 Dec. 20, 2012

(30) Foreign Application Priority Data

Jun. 16, 2011 (KR) ........................ 10-2011-0058641

(51) Int. Cl.
*H04N 5/232* (2006.01)
(52) U.S. Cl.
USPC .......................................... 348/345; 348/347

(58) Field of Classification Search
None
See application file for complete search history.

(56) References Cited

U.S. PATENT DOCUMENTS

| 7,948,549 | B2 * | 5/2011 | Honjo et al. | 348/333.05 |
| 2009/0180771 | A1 * | 7/2009 | Liu et al. | 396/61 |
| 2009/0256951 | A1 * | 10/2009 | Yumiki | 348/345 |
| 2011/0002678 | A1 * | 1/2011 | Misawa | 396/63 |
| 2011/0248942 | A1 * | 10/2011 | Yana et al. | 345/173 |

* cited by examiner

*Primary Examiner* — Twyler Haskins
*Assistant Examiner* — Angel L Garces-Rivera
(74) *Attorney, Agent, or Firm* — Drinker Biddle & Reath LLP (57) ABSTRACT

A digital photographing apparatus allows users to directly reflect their DOF intention to the digital photographing apparatus before a photo is taken, thereby facilitating a more accurate representation of DOF. A method for controlling the digital photographing apparatus includes receiving depth-of-field (DOF) information, calculating an aperture value corresponding to the DOF information, and controlling photographing using the calculated aperture value.

16 Claims, 6 Drawing Sheets

DIGITAL PHOTOGRAPHING APPARATUS AND METHOD FOR CONTROLLING THE SAME BASED ON USER-SPECIFIED DEPTH OF FOCUS REGION

CROSS-REFERENCE TO RELATED PATENT APPLICATION

This application claims the priority benefit of Korean Patent Application No. 10-2011-0058641, filed on Jun. 16, 2011, in the Korean Intellectual Property Office, the disclosure of which is incorporated herein in its entirety by reference.

BACKGROUND

1. Field

Embodiments relate to a digital photographing apparatus, and more particularly, to a method for controlling the digital photographing apparatus.

2. Description of the Related Art

Depth-of-field (DOF) is used to distinguish the state in which all subjects in a photo appear sharp from the state in which only a specific subject is sharp but the remaining subjects appear blurred. That is, a DOF refers to the range of distances within which subjects appear sharp in a picture. A large DOF means that a wide range of subjects are in focus. A shallow DOF means that a narrow range of subjects are in focus.

A user indirectly adjusts the DOF of a photograph by controlling the aperture number. When a user desires to obtain a photo with a narrow range of distances in focus, the aperture value is decreased so that an aperture opens wide, thereby allowing representation of a photo with a shallow DOF. Conversely, when the user desires to obtain a photo with a wide range of distances in focus, the aperture value is increased so that an aperture opens narrow, thereby allowing representation of a photo with a large DOF.

SUMMARY

Embodiments include a digital photographing apparatus and a method for controlling the same, which allow easy representation of the depth-of-field (DOF) while facilitating creation of a photographing result that will match the user's intention.

According to an embodiment, a method for controlling a digital photographing apparatus includes: receiving an input of depth-of-field (DOF) information; calculating an aperture value corresponding to the DOF information; and controlling a photographing operation using the calculated aperture value.

The method may further include controlling a focus with respect to an input image. The aperture value may be calculated by increasing an aperture value by one step from a minimum aperture value for the input image.

The method may further include performing auto-focusing (AF) on an input image according to a shutter release signal. In the receiving of the DOF information, a degree of the DOF may be input on an AF frame for performing the AF.

The method may further include determining a shutter speed based on exposure information. The photographing operation may be controlled using the calculated aperture value and the determined shutter speed.

The calculating of the aperture value may include calculating a high frequency component while increasing an aperture value from a region on which an input image is focused to a region corresponding to the DOF information and determining an aperture value at which the calculated high frequency component begins to decrease as an aperture value corresponding to the DOF information.

The method may further include determining whether the input DOF information is coincident with the calculated aperture value. When the input DOF information coincides with the calculated aperture value, the photographing operation may be controlled using the calculated aperture value.

The method may further include displaying a region corresponding to the DOF information on a display screen when the input DOF information is coincident with the calculated aperture value.

In the receiving of the input of the DOF information, the DOF information may be received by enlarging or reducing a focus frame for an input image.

The DOF information may be received in the form of a region containing a quadrilateral or circle.

The DOF information may be received through a dial-type, switch-type, or touch-type input device.

According to another embodiment, a digital photographing apparatus includes: a DOF information input unit that receives an input of DOF information; a DOF calculator that calculates an aperture value corresponding to the DOF information; and a controller that controls a photographing operation using the calculated aperture value.

The digital photographing apparatus may further include a focus controller that controls a focus with respect to an input image and an aperture drive controller that controls an aperture driver so as to increase an aperture value by one step from a minimum aperture value for the input image. The DOF calculator may calculate aperture values for images for which the aperture values are increased by one step from the minimum aperture value according to a control of the aperture drive controller.

The digital photographing apparatus may further include an AF controller that performs AF on an input image according to a shutter release signal. The DOF information input unit may receive the degree of the DOF on an AF frame for performing the AF.

The digital photographing apparatus may further include a shutter speed determiner that determines a shutter speed based on exposure information. The controller may control the photographing operation using the calculated aperture value and the determined shutter speed.

The DOF calculator may calculate a high frequency component while increasing an aperture value from a region on which an input image is focused to a region corresponding to the DOF information and determine an aperture value at which the calculated high frequency component begins to decrease as an aperture value corresponding to the DOF information.

The controller may determine whether the input DOF information is coincident with the calculated aperture value and, when the input DOF information coincides with the calculated aperture value, controls the photographing operation using the calculated aperture value.

The digital photographing apparatus may further include a region display controller that displays a region corresponding to the DOF information on a display screen when the input DOF information is coincident with the calculated aperture value.

The DOF information input unit may receive the DOF information by enlarging or reducing a focus frame for an input image.

The DOF information may be a region containing a quadrilateral or circle that is input through a dial-type, switch-type, or touch-type input device.

According to another embodiment, a non-transitory recording medium has recorded thereon a program for executing the method for controlling the digital photographing apparatus on a computer.

A method for controlling a digital photographing apparatus according to an embodiment allows a user to directly deliver his/her intention for DOF to a digital camera before a photo is taken, thereby facilitating more accurate representation of DOF.

BRIEF DESCRIPTION OF THE DRAWINGS

The above and other features and advantages will become more apparent by describing in detail exemplary embodiments with reference to the attached drawings in which.

DETAILED DESCRIPTION

Exemplary embodiments will now be described more fully with reference to the accompanying drawings. An identical or corresponding component is assigned the same reference numeral and a detailed description thereof will be omitted.

Figure 1:
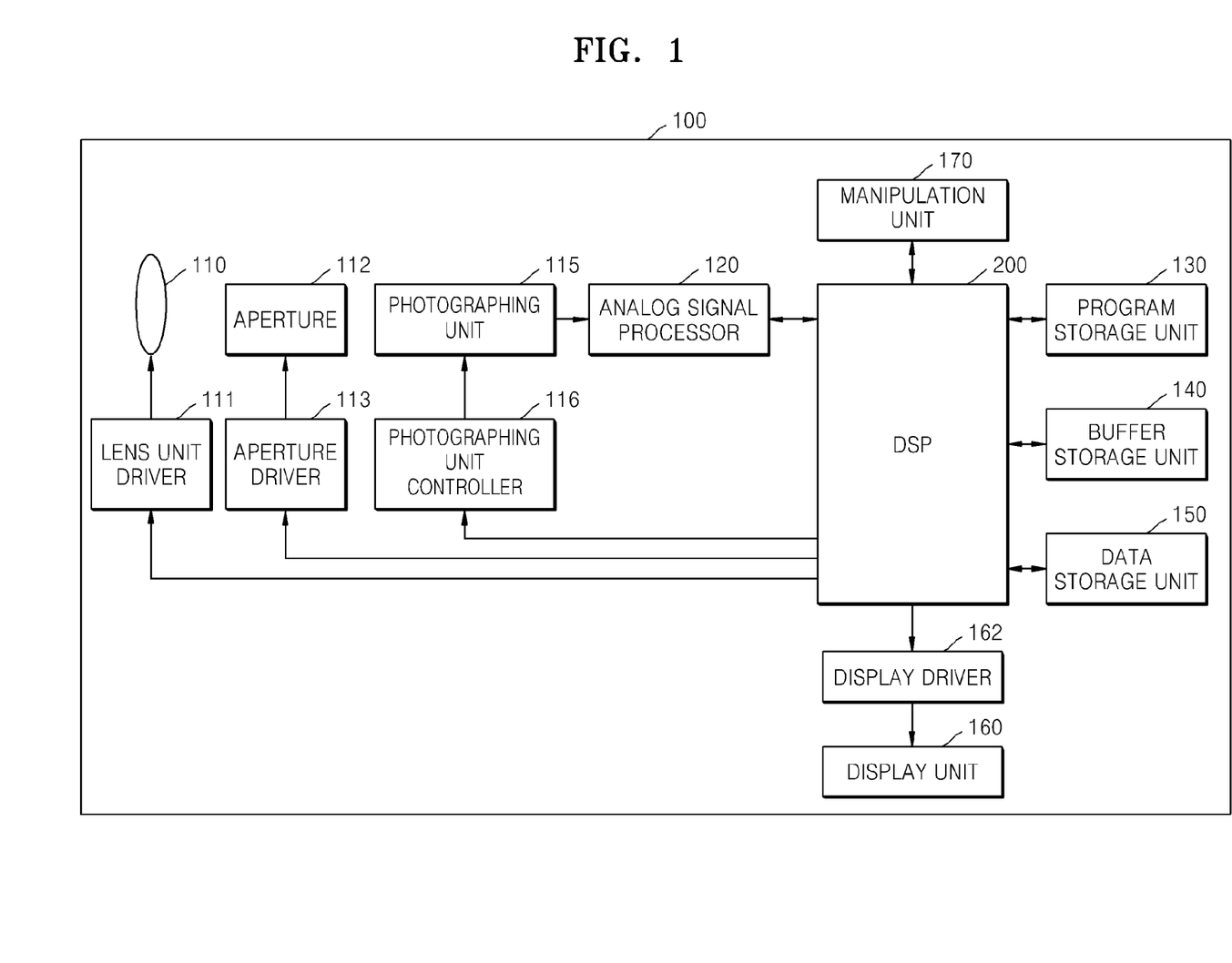
FIG. 1 is a block diagram of a digital camera as a digital photographing apparatus, according to an embodiment.

FIG. 1 is a block diagram of a digital camera 100 as a digital photographing apparatus, according to an embodiment. While the digital camera 100 is used as an example of the digital photographing apparatus, the digital photographing apparatus may be a camera phone, a personal digital assistant (PDA), a portable multimedia player (PMP), or other digital devices.

The digital camera 100 according to an embodiment includes a lens unit 110, a lens unit driver 111, an aperture 112, an aperture driver 113, a photographing unit 115, a photographing unit controller 116, an analog signal processor 120, a program storage unit 130, a buffer storage unit 140, a data storage unit 150, a display driver 162, a display unit 160, a digital signal processor (DSP) 200, and a manipulation unit 170. In this case, the lens unit 110, the lens unit driver 111, the aperture 112, the aperture driver 113, the photographing unit 115, the photographing unit controller 116, and the analog signal processor 120 may be referred to as a "photographing device".

The lens unit 110 focuses an optical signal and includes a zoom lens, which adjusts an angle of view depending on a focal length, and a focus lens that focuses on a subject. The zoom lens and the focus lens may be individual lenses or may be constituted by a lens group including a plurality of lenses.

The aperture 112 opens or closes in order to control the intensity of incident light. In one embodiment, the extent to which the aperture 112 opens is adjusted to represent a depth of field (DOF) of a subject.

The lens unit driver 111 and the aperture driver 113 receive a control signal from the DSP 200 and drive the lens 110 and the aperture 112, respectively. The lens unit driver 111 controls a focal length by adjusting a position of a lens and performs operations such as auto-focusing (AF), zoom change, and focus change. The aperture driver 113 adjusts the extent to which the aperture 112 opens or closes and in particular, an F-number or aperture value in order to perform AF, automatic exposure correction, focus change, and adjustment of DOF. In one embodiment, DOF information, of a region type, is received directly from a user, an aperture value corresponding to the DOF information is calculated, and photographing is performed using the calculated aperture value.

The optical signal that has passed through the lens unit 110 is focused on a light-receiving surface of the photographing unit 115 as an image of a subject. The photographing unit 115 may be a Charge-Coupled Device (CCD), a Complementary Metal-Oxide Semiconductor Image Sensor (CIS), or a high-speed image sensor that converts an optical signal into an electrical signal. The photographing unit controller 116 may regulate the sensitivity and other factors of the photographing unit 115. The photographing unit controller 116 may control the photographing unit 115 according to a control signal automatically created by an image signal input in real time or a control signal manually input by user manipulation.

The exposure time of the photographing unit 115 may be adjusted by a shutter (not shown). The shutter may be classified into a mechanical shutter that adjusts the amount of light entering the photographing unit 115 by moving a black screen, and an electronic shutter that controls exposure by supplying an electric signal to the photographing unit 115.

The analog signal processor 120 performs noise reduction, gain control, waveform shaping, and analog-to-digital conversion on an analog signal supplied by the photographing unit 115.

The manipulation unit 170 allows an input of control signals from a user or an external input device. The manipulation unit 170 may include a shutter release button for inputting a shutter-release signal that is used to take photographs by exposing the photographing unit 115 to incoming light for a predetermined time, a power button for inputting a control signal in order to control the power on/off state of the digital camera 100, a wide angle-zoom button and a telephoto-zoom button for respectively widening and narrowing an angle of view according to an input, and various function buttons for selecting a text input mode, a photo taking mode, and a reproduction mode and for selecting a white balance setting function and an exposure setting function. While the manipulation unit 170 may be implemented by various buttons described above, the manipulation unit 170 may not be limited thereto and may be any form that allows user input, such as a keyboard, a touch pad, a touch screen, or a remote controller.

Furthermore, the manipulation unit 170 enables a user to enter DOF information in the form of a region. In this case, the manipulation unit 170 may be implemented as a touch screen, switch, or dial, so that the user can conveniently input a desired DOF region. The manipulation unit 170 may also allow the user to set a DOF priority mode in which photographing is performed based on the DOF information input by the user.

The program storage unit 130 stores programs such as an operating system for operating the digital camera 100 and application programs. The buffer storage unit 140 temporarily stores data required to perform operations or resultant data. The data storage unit 150 stores image files containing image signals as well as various pieces of information necessary for the programs.

The display unit 160 displays an operating state of the digital camera 100 and image information obtained therefrom. The display unit 160 may provide visual and audio information to a user. In order to provide visual information, the display unit 160 may consist of a liquid crystal display (LCD) or organic light-emitting diode (OLED) display. The display driver 162 supplies a driving signal to the display unit 160.

The DSP 200 processes an input image signal and controls each component of the digital camera 100 according to the resulting image signal or an external input signal.

The DSP 200 may perform image signal processing on input image data, such as noise reduction, gamma correction, color filter array interpolation, color matrix processing, color correction, and color enhancement in order to improve the quality of images. The DSP 200 may also compress the image data obtained by the image signal processing into an image file or reconstruct the original image data from the image file. An image compression algorithm may be invertible or non-invertible. The compressed data may be stored in the data storage unit 150. Furthermore, the DSP 200 may perform functional processing such as sharpness processing, chromatic processing, blur processing, edge emphasis, image interpretation, image recognition, or image effect processing. The image recognition processing may include face recognition and scene recognition. For example, the DSP 200 may perform luminance level adjustment, color correction, contrast adjustment, edge enhancement, screen segmentation, or adaptive character image generation and synthesis.

The DSP 200 also executes programs stored in the program storage unit 130 or includes a separate module to generate control signals for controlling AF, zoom change, focus change, and automatic exposure correction, to provide the control signals to the lens unit driver 111, the aperture driver 113, and the photographing unit controller 116, and to control overall operations of components in the digital camera 100 such as a shutter or flash.

Figure 2:
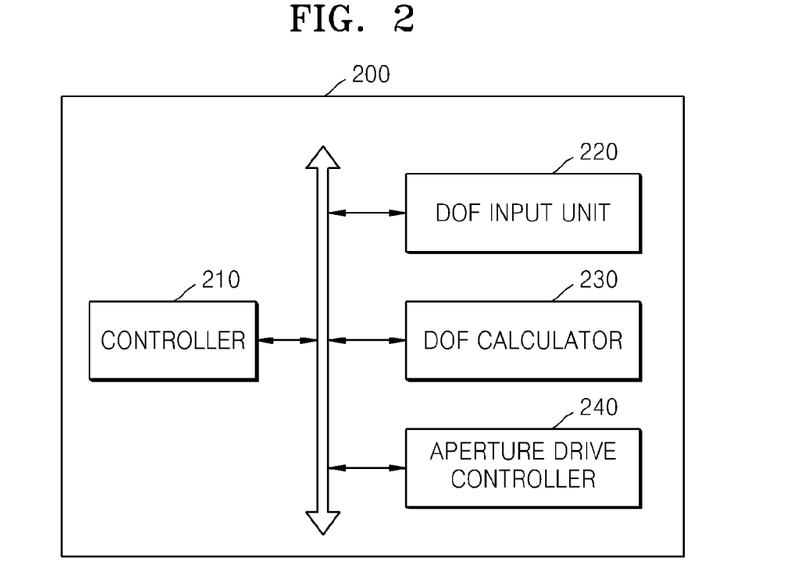
FIG. 2 is a detailed block diagram of an example of a digital signal processor (DSP) shown in FIG. 1.

FIG. 2 is a detailed block diagram of an example of the DSP 200 shown in FIG. 1. Referring to FIG. 2, the DSP 200 includes a controller 210, a DOF information input unit 220, a DOF calculator 230, and an aperture drive controller 240. In this case, one of ordinary skill in the art would understand that the DSP 200 is the same as a digital photographing apparatus recited in the claims.

The controller 210 controls overall operation of the DSP 200. The DOF information input unit 220 receives DOF information. The DOF information refers to a region containing a quadrilateral or circle input through a dial-type, switch-type, or touch-type input device. A user directly enters a desired DOF range, i.e., a range of a region that is in focus through the manipulation unit 170. That is, the user may reflect their DOF intention directly to the digital camera 100 before taking a photograph. Thus, besides simply changing an aperture value, the user may accurately represent a DOF when viewing a preview image directly being displayed on a screen.

The DOF calculator 230 calculates an aperture value corresponding to DOF information entered by the user, i.e., which makes a region corresponding to the DOF information appear in focus. The input of DOF information and calculation of a DOF will now be described with reference to FIGS. 5 and 6.

Figure 5:
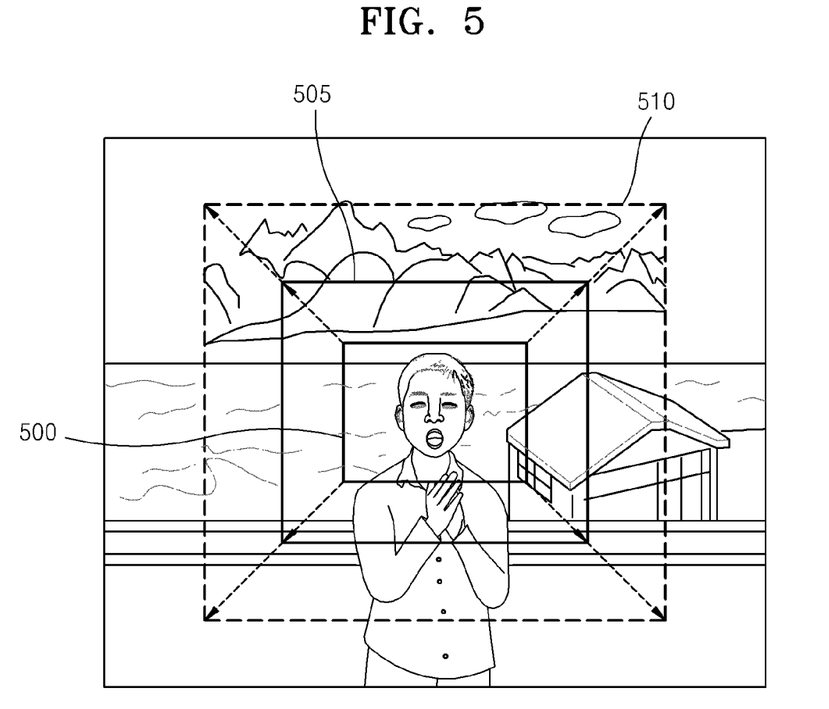
FIGS. 5 and 6 are exemplary diagrams for explaining input of depth-of-field (DOF) information and calculation of the DOF, according to another embodiment.
Figure 6:
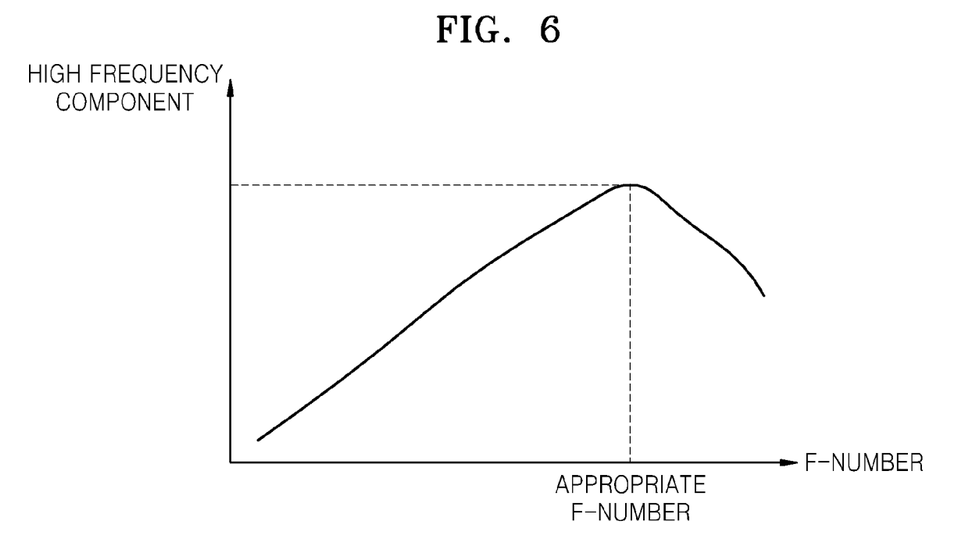

FIGS. 5 and 6 are exemplary diagrams for explaining input of depth-of-field (DOF) information and calculation of the DOF, according to another embodiment. Referring to FIG. 5, in order to focus on a subject's face of an input image, a focus frame 500 is displayed and a focus control is performed on the focus frame 500 using manual focusing or AF. The AF may be performed using contrast detection, or other methods such as pan-focus control and phase difference detection. Contrast detection AF is performed by moving a focus lens to a position within an AF target region, i.e., the focus frame 500, at which a contrast value is highest. That is, the AF mechanism includes converting a contrast value of the photographing unit 115 such as a CCD into an electrical signal and interpreting a waveform of the electrical signal while moving the focus lens, and focusing the focus lens on a lens position at which the waveform has the highest frequency component.

When the focus lens focuses on the focus frame 500, i.e., after the focus lens is moved to a focal position, DOF information is received from a user. As shown in FIG. 5, the user inputs a DOF region 510 as the DOF information. While the input DOF information is enlarged to be greater than the size of the focus frame 500, the DOF information may be reduced to be less than that. For example, if the manipulation unit 170 is a dial type manipulation unit, the DOF information may be input by turning the dial either to the left or to the right in order to enlarge or reduce the size of a set focus frame. A user may also set the DOF region 510, regardless of the focus frame 500, or input the DOF information in the form of a circle or various other shapes.

When the focus lens focuses on the focus frame 500, the DOF calculator 230 calculates whether an aperture value for a current input image is an aperture value appropriate for the DOF information set by the user while the aperture drive controller 240 is increasing the aperture value by one step from a minimum aperture value. Referring to FIG. 6, an f-number corresponding to an aperture increases in the direction of a transverse axis while a high frequency component increases in the direction of a longitudinal axis within a region indicated by dashed lines. The high frequency component increases up to the DOF region 510 set by the user but decreases after the DOF region 510. Thus, the DOF calculator 230 detects high frequency components from regions in the current input image, i.e., the focus frame 500, an intermediate region 505, and the DOF region 510 set by the user while increasing the minimum aperture value by one step and calculates an aperture value, which corresponds to the appropriate f-number at a portion where an increase rate of the high frequency component begins to decrease, as a region corresponding to the DOF information set by the user.

The controller 210 controls overall operation of the DSP 200 so that photographing is performed using the aperture value obtained by the DOF calculator 230.

The aperture drive controller 240 controls the aperture driver 113 so as to increase an aperture value by one step from the minimum aperture value for an input image. The DOF calculator 230 calculates a DOF for the input image using an aperture value corresponding to each step while increasing the aperture value by one step from the minimum aperture value according to a control of the aperture drive controller 240

The DSP 200 may further include a focus controller (not shown) for controlling a focus on an input image or an autofocus controller (not shown) for performing an AF on the input image according to a shutter release signal.

Figure 3:
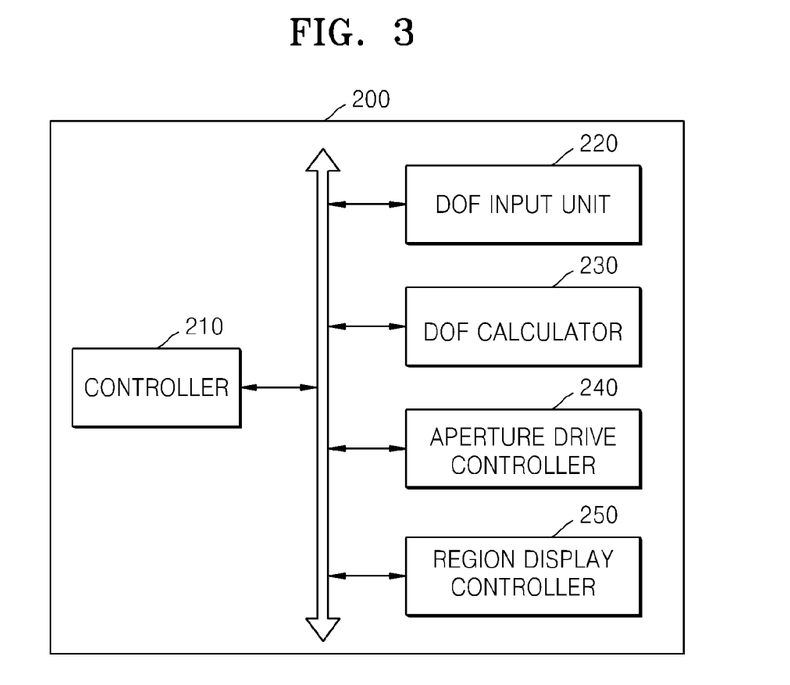
FIG. 3 is a detailed block diagram of another example of the DSP shown in FIG. 1.

FIG. 3 is a detailed block diagram of another example of the DSP 200 shown in FIG. 1. Hereinafter, only a new component is described and a description of components that are the same as those in the DSP 200 of FIG. 2 is omitted.

Unlike in FIG. 2, the DSP 200 of FIG. 3 further includes a region display controller 250. When DOF information input by a user is coincident with an aperture value obtained by the DOF calculator 230, the region display controller 250 controls the display unit 160 to display a region corresponding to the DOF information on a screen. Referring to FIG. 5, when the user finds an appropriate aperture value, i.e., an aperture value corresponding to the input DOF information, the region display controller 250 controls the display unit 160 to display the DOF region 510 in a different color, e.g., in green, than an initial region frame, so as to inform the user that the DOF can be represented up to the DOF region 510. Conversely, when the DOF region 510 set by the user is too wide or when the DOF cannot be represented up to the DOF region 510 due to a currently used lens and a camera-to-subject distance, a message or specific indication may be displayed in order to inform this state to the user.

Figure 4:
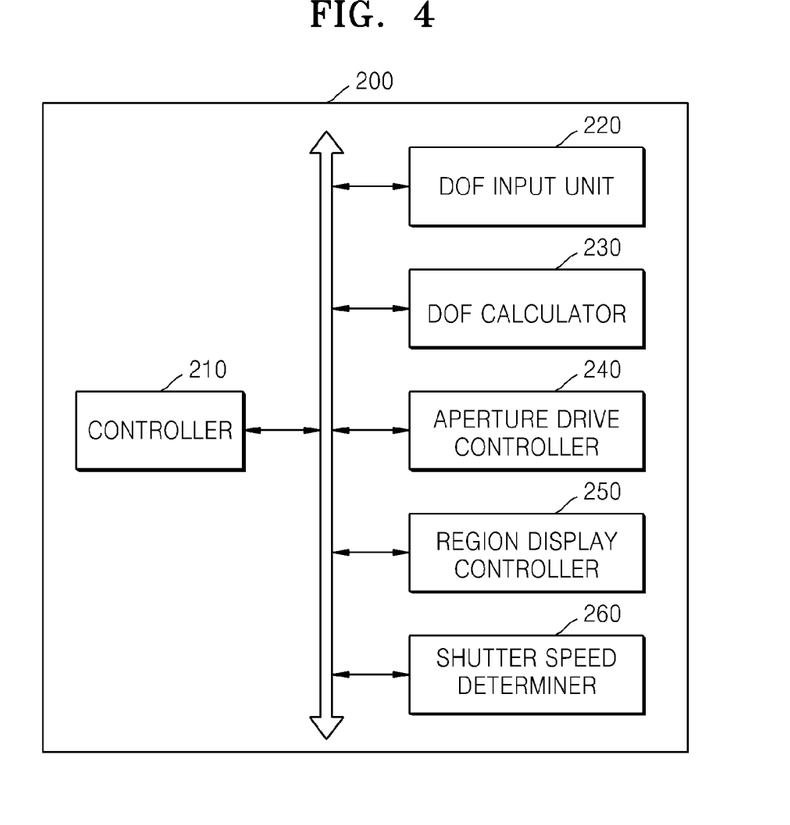
FIG. 4 is a detailed block diagram of another example of the DSP shown in FIG. 1.

FIG. 4 is a detailed block diagram of another example of the DSP 200 shown in FIG. 1. Hereinafter, only a new component is described and not components that are the same as those in the DSPs 200 of FIGS. 2 and 3.

Unlike in FIGS. 2 and 3, the DSP 200 of FIG. 4 further includes a shutter speed determiner 260. The shutter speed determiner 260 receives light intensity based on an aperture value corresponding to DOF information set by the user to obtain exposure information and determines a shutter speed according to the exposure information. In other words, when the photograph is taken using an aperture value set by the user, i.e., in a DOF priority mode, the shutter speed determiner 260 determines a shutter speed required for obtaining a photograph having appropriate brightness according to the light intensity received based on the set aperture value.

Figure 7:
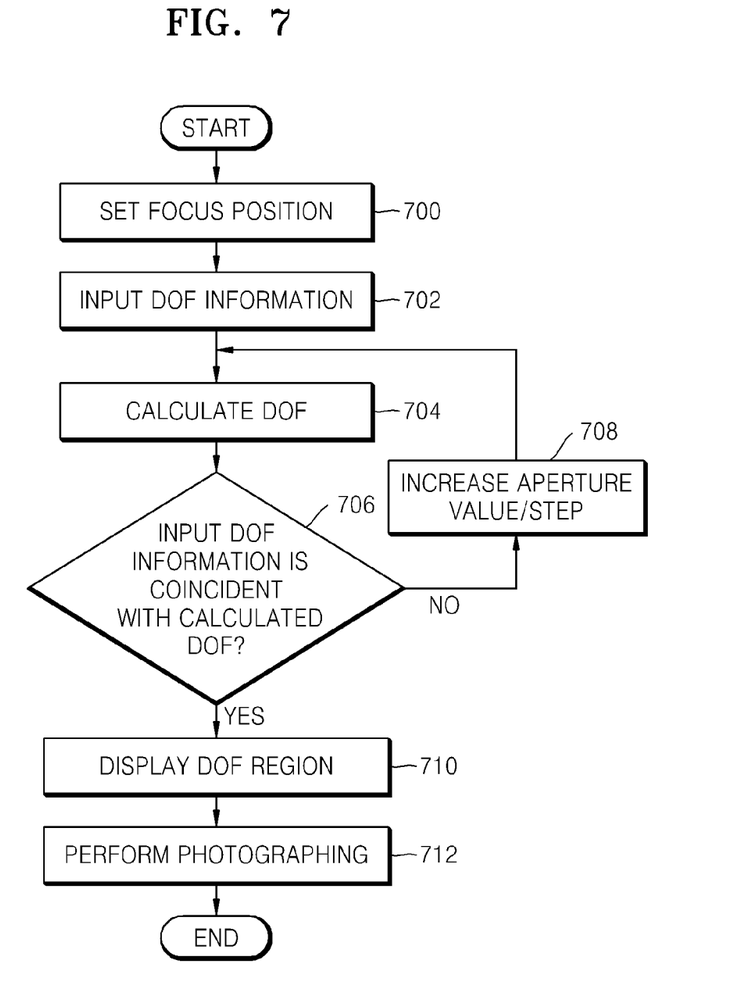
FIG. 7 is a flowchart of a method for controlling a digital photographing apparatus, according to an embodiment.

FIG. 7 is a flowchart of a method for controlling a digital photographing apparatus, according to an embodiment. Referring to FIG. 7, in operation 700, a focus position is set by manual focusing or AF.

In operation 702, DOF information is input. A user enters desired DOF information through a user interface in the digital camera 100, such as a dial-type, switch-type, or touch-type input device. In this case, DOF information may be a region containing a shape such as a circle or quadrilateral that defines the region.

In operations 704 and 706, a DOF is calculated and it is determined whether the DOF information input by the user matches the calculated DOF. The calculation of DOF includes setting a minimum aperture value for a region that is currently in focus and determining whether high frequency components increase in each region while widening a range of the region and increasing an aperture value by one step from the minimum aperture value. That is, when the high frequency component increases each time the aperture value increases by one step and begins to decrease at a specific aperture value, it is determined that the DOF information input by the user is coincident with the calculated DOF information obtained in operation 704 at the specific aperture value. In this case, while such a determination is made based on an increase/decrease of the high frequency component, the determination is made by detecting a frequency component in a specific frequency band, or using other methods When the input DOF information is not coincident with the calculated DOF obtained in operation 704, an aperture value is increased by one step in operation 708 and the method returns to operation 704. In this case, one step is a minimum value required for driving the aperture 112 and predetermined for each type of digital camera. While the aperture value is increased by one step, as described above, it is not limited thereto. Conversely, when the input DOF information is coincident with the DOF obtained in operation 704, the method proceeds to operation 710 in order to display a DOF region.

More specifically, the user is informed that an appropriate aperture value has been found so as to represent a DOF up to the DOF region input by the user. Upon selection, e.g., S2 by the user, photographing is performed using the found aperture value in operation 712.

Figure 8:
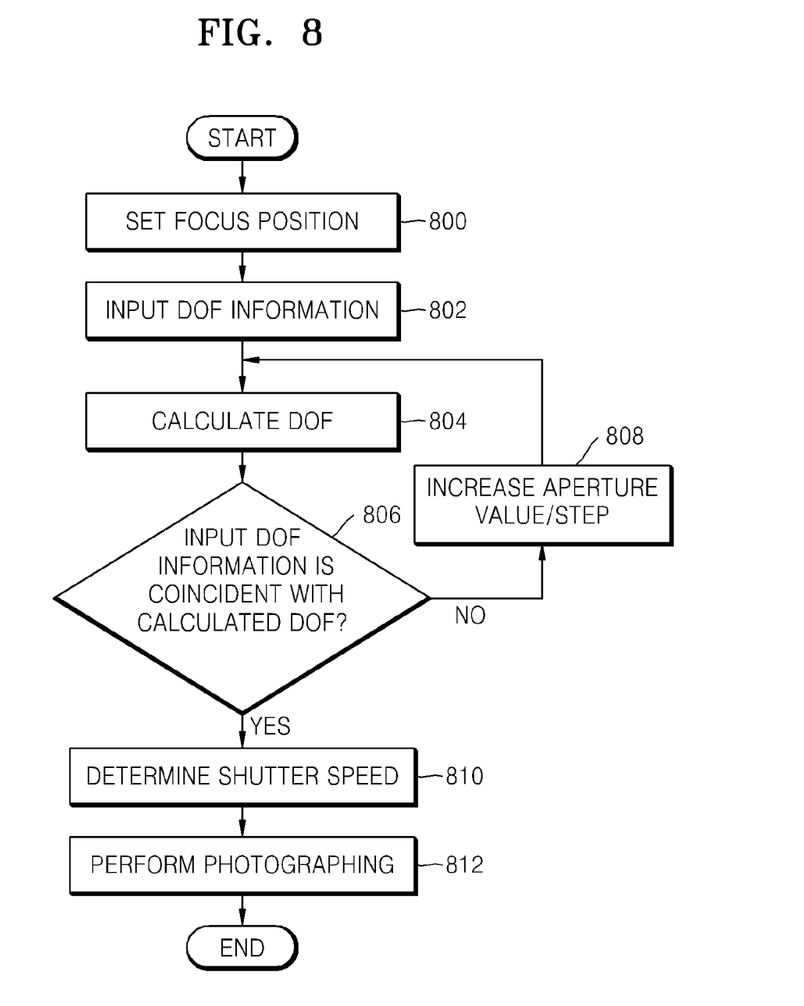
FIG. 8 is a flowchart of a method for controlling a digital photographing apparatus, according to another embodiment.

FIG. 8 is a flowchart of a method for controlling a digital photographing apparatus, according to another embodiment. Hereinafter, operations that are the same as those of the method of FIG. 7 are omitted and only a difference from the method of FIG. 7 is described.

Referring to FIG. 8, operations 800, 802, 804, 806, and 808 are the same as operations 700, 702, 704, 706, and 708, respectively, in FIG. 7. When the input DOF information is coincident with an obtained DOF in operation 806, the method proceeds to operation 810 in order to determine a shutter speed. In other words, when a photograph is taken using an aperture value set by the user, i.e., in a DOF priority mode, a shutter speed required for obtaining a photograph having appropriate brightness is determined according to the light intensity received based on the set aperture value. Alternatively, operation 710 of displaying a DOF region may be performed after operation 806 or 810. Upon selection, e.g., S2, by the user in operation 812, photographing is performed using the aperture value determined in operation 806 and at the shutter speed determined in operation 810.

A digital photographing apparatus and a method for controlling the digital photographing apparatus, according to embodiments of the present invention, allow a user to directly reflect their DOF intention to the digital photographing apparatus before a photo is taken, thereby facilitating a more accurate representation of DOF. A conventional digital photographing apparatus and a method for controlling the same have a problem that the user's DOF intention is difficult to reflect to a photographing result because it is indirectly reflected to an aperture value. Thus, the user has to repeatedly adjust an aperture value according to a photographing result. Furthermore, due to a limitation in size of a display in a digital camera, i.e., a digital photographing apparatus, it is difficult to accurately recognize the degree of DOF reflected to a subject. Embodiments of the present invention can solve the above-described problems.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A method for controlling a digital photographing apparatus, the method comprising:
   receiving an input of depth-of-field (DOF) information;
   calculating an aperture value corresponding to the DOF information by:
      calculating a high frequency component while increasing an aperture value from a region on which an input image is focused to a region corresponding to the DOF information; and
      determining an aperture value at which the calculated high frequency component begins to decrease as an aperture value corresponding to the DOF information;
   determining whether the input DOF information is coincident with the calculated aperture value; and
   controlling a photographing operation using the calculated aperture value,
   wherein the controlling of the photographing operation is performed using the calculated aperture value when the input DOF information coincides with the calculated aperture value.

2. The method of claim 1, further comprising performing auto-focusing (AF) on an input image according to a shutter release signal,
   wherein in the receiving of the input of the DOF information, a degree of the DOF is input on an AF frame for performing the AF.

3. The method of claim 1, further comprising determining a shutter speed based on exposure information,
   wherein in the controlling of the photographing operation, the photographing operation is controlled using the calculated aperture value and the determined shutter speed.

4. The method of claim 1, wherein in the receiving of the input of the DOF information, the DOF information is received by enlarging or reducing a focus frame for an input image.

5. The method of claim 1, wherein the DOF information is received in the form of a region containing a quadrilateral or circle.

6. The method of claim 1, wherein the DOF information is received through one of dial-type, switch-type, and touch-type input devices.

7. A non-transitory computer-readable recording medium on which a program for executing the method of claim 1 on a computer is recorded.

8. A method for controlling a digital photographing apparatus, the method comprising:
- receiving an input of depth-of-field (DOF) information;
- calculating an aperture value corresponding to the DOF information;
- determining whether the input DOF information is coincident with the calculated aperture value;
- controlling a photographing operation using the calculated aperture value; and
- controlling a focus with respect to an input image, wherein:
- the controlling of the photographing operation is performed using the calculated aperture value when the input DOF information coincides with the calculated aperture value; and
- the calculating of the aperture value is performed by increasing an aperture value by one step from a minimum aperture value for the input image.

9. A method for controlling a digital photographing apparatus, the method comprising:
- receiving an input of depth-of-field (DOF) information;
- calculating an aperture value corresponding to the DOF information;
- determining whether the input DOF information is coincident with the calculated aperture value;
- controlling a photographing operation using the calculated aperture value; and
- displaying a region corresponding to the DOF information on a display screen when the input DOF information is coincident with the calculated aperture value, wherein:
- the controlling of the photographing operation is performed using the calculated aperture value when the input DOF information coincides with the calculated aperture value.

10. A digital photographing apparatus comprising:
- a depth-of-field (DOF) information input unit that receives an input of DOF information;
- a DOF calculator that calculates an aperture value corresponding to the DOF information by:
  - calculating a high frequency component while increasing an aperture value from a region on which an input image is focused to a region corresponding to the DOF information; and
  - determining an aperture value at which the calculated high frequency component begins to decrease as an aperture value corresponding to the DOF information; and
- a controller that controls a photographing operation using the calculated aperture value,
- wherein the controller determines whether the input DOF information is coincident with the calculated aperture value and, when the input DOF information coincides with the calculated aperture value, controls the photographing operation using the calculated aperture value.

11. The apparatus of claim 10, further comprising an autofocusing (AF) controller that performs AF on an input image according to a shutter release signal, wherein the DOF information input unit receives the degree of the DOF on an AF frame for performing the AF.

12. The apparatus of claim 10, further comprising a shutter speed determiner that determines a shutter speed based on exposure information,
- wherein the controller controls the photographing operation using the calculated aperture value and the determined shutter speed.

13. The apparatus of claim 10, wherein the DOF information input unit receives the DOF information by enlarging or reducing a focus frame for an input image.

14. The apparatus of claim 10, wherein the DOF information is a region containing a quadrilateral or circle that is input through one of dial-type, switch-type, and touch-type input devices.

15. A digital photographing apparatus comprising:
- a depth-of-field (DOF) information input unit that receives an input of DOF information;
- a DOF calculator that calculates an aperture value corresponding to the DOF information;
- a controller that controls a photographing operation using the calculated aperture value;
- a focus controller that controls a focus with respect to an input image; and
- an aperture drive controller that controls an aperture driver so as to increase an aperture value by one step from a minimum aperture value for the input image, wherein:
- the controller determines whether the input DOF information is coincident with the calculated aperture value and, when the input DOF information coincides with the calculated aperture value, controls the photographing operation using the calculated aperture value; and
- the DOF calculator calculates aperture values for images for which the aperture values are increased by one step from the minimum aperture value according to a control of the aperture drive controller.

16. A digital photographing apparatus comprising:
- a depth-of-field (DOF) information input unit that receives an input of DOF information;
- a DOF calculator that calculates an aperture value corresponding to the DOF information;
- a controller that controls a photographing operation using the calculated aperture value; and
- a region display controller that displays a region corresponding to the DOF information on a display screen when the input DOF information is coincident with the calculated aperture value;

wherein:
- the controller determines whether the input DOF information is coincident with the calculated aperture value and, when the input DOF information coincides with the calculated aperture value, controls the photographing operation using the calculated aperture value.

* * * * *